United States Patent [19]

Nitta et al.

[11] 3,843,285
[45] Oct. 22, 1974

[54] APPARATUS FOR MANUFACTURING A FOAM HAVING A DENSE SURFACE

[75] Inventors: Harjo Nitta; Naotoshi Sagawa, both of Yokkaichi, Japan

[73] Assignee: Mitsubishi Petrochemical Co., Ltd., Chiyoda-ku, Tokyo-to, Japan

[22] Filed: Apr. 5, 1973

[21] Appl. No.: 348,351

Related U.S. Application Data

[62] Division of Ser. No. 100,615, Dec. 22, 1970, abandoned.

[30] Foreign Application Priority Data

Dec. 22, 1969   Japan.............................. 44-102544

[52] U.S. Cl................... 425/4 R, 264/51, 264/311, 425/429, 425/435, 425/817 R
[51] Int. Cl............................................ B29d 27/04
[58] Field of Search ....... 425/4, 817, 425, 435, 404, 425/405 R, 405 H, 429; 264/45, 50, 51, 94, 310, 311, 327; 122/11, 12

[56]   References Cited
UNITED STATES PATENTS

| 3,042,973 | 7/1962 | Brockhues et al............. | 425/817 X |
| 3,514,508 | 5/1970 | Schott et al.................... | 425/404 X |

*Primary Examiner*—R. Spencer Annear
*Assistant Examiner*—Mark Rosenbaum
*Attorney, Agent, or Firm*—Sughrue, Rothwell, Mion, Zinn & Macpeak

[57]   ABSTRACT

A foam body having a relatively denser surface is molded in one step by placing a synthetic resin powder and a foamable synthetic resin bead in a metallic mold. The metallic mold is rotated and heated about its own axis while simultaneously being rotated about a second perpendicular axis. A steam producing tank is connected to the mold and after the synthetic resin powder is molten and molded on the inner surface of the metallic mold, steam is introduced to foam the synthetic resin beads.

5 Claims, 2 Drawing Figures

APPARATUS FOR MANUFACTURING A FOAM HAVING A DENSE SURFACE

CROSS-REFERENCE TO RELATED APPLICATIONS

This application is a Divisional application of our earlier co-pending application Ser. No. 100,615, filed on Dec. 22, 1970, now abandoned, which claims priority from Dec. 22, 1969, based on Japanese Pat. application Ser. No. 102544/69.

BACKGROUND OF THE INVENTION

1. Field of the Invention

The present invention relates to a process and apparatus for manufacturing a foamed body having a skin or relatively denser surface which covers a synthetic resin foam interior.

2. Description of the Prior Art

Generally, the prior art has resorted to two different methods of preparing a foam body having a relatively thick skin or a denser surface. One method resorted to forming the outside surface or skin in a separate step and then adding a urethane resin into the previously formed hollow vessel. The second method of molding a relatively hard synthetic resin skin on the outside and a polystyrene foam in the interior comprised charging a synthetic resin powder with a water containing inorganic substance and placing this modified resin powder into a hollow type mold with a foamable polystyrene bead. The mold was rotated and heated and formed a relatively hard synthetic resin skin on the inside of the mold surface. The foaming of the polystyrene was accomplished by the steam produced from the water of the inorganic substance.

The use of a previously molded thick skin made of synthetic resin is deficient in requiring considerable time in introducing the urethane resin into the interior of the molded shell. Problems also occur in attempting to cure the resin while foaming it. This difficulty also occurs in introducing the combination of the synthetic resin powder with a water containing inorganic substance and a foamable polystyrene bead into the hollow type mold since the amount of steam produced was insufficient to accomplish the degree of foaming desired. Further the amount of water that could be introduced by the inorganic substance was limited since the inorganic substance would effect the strength of the coated skin because it was incorporated into the synthetic resin skin during the process.

Attempts in the prior art to introduce steam into a metallic mold where the steam is produced in an apparatus arranged by the side of a rotating molding machine has incurred numerous difficulties since the introducing mechanism becomes, by necessity, complicated because the metallic mold rotates in the direction of two perpendicular axes at the same time. Generally, it has been found that the steam will condense and that a large amount of water will remain in the molded body.

SUMMARY OF THE INVENTION

The primary object of the present invention is to provide a process and apparatus for molding a foamed body having a relatively unfoamed hard resin layer on the surface in one complete step.

Another object of the present invention is to provide a process and apparatus for manufacturing a skinned foam body comprising introducing steam having a large amount of thermal energy into a rotating metallic mold and uniformly and completely foaming a foamable synthetic resin bead.

The present invention provides the apparatus and teaches a process for manufacturing a skinned foam body by heating a metallic mold containing a synthetic resin powder and a foamable synthetic resin bead where the mold is rotated and the synthetic resin powder forms the dense skin. Steam is then introduced into the metallic mold to foam a foamable synthetic resin bead and thereby produce a foamed body having an outer layer composed of synthetic resin and an inner layer composed of foamable synthetic resins which are distinctly separated while at the same time, permitting the foamable synthetic resin bead to be completely foamed.

The present invention accomplishes the above process by providing a steam producing tank on the same axis as the axis that is supporting the metallic mold and rotating the tank together with the metallic mold while subjecting both to a heating process. With this apparatus there is both a simplicity in the mechanism and an economy in cost and there are no problems associated with the steam being condensed in the interior of the foamed body.

By utilizing the apparatus of the present invention it is possible to inject steam from the steam producing tank into the metallic mold while the mold is rotating in an even and orderly fashion. Further, the pressure of the steam and the amount can be optionally controlled and accordingly the foaming process can be accomplished in which the foam is polystyrene and it is foamed to a degree 40 or 50 times its original size. The present process and apparatus can be utilized on foamable polyolefin synthetic resin material other than polystyrene.

DESCRIPTION OF THE PREFERRED EMBODIMENT

Figure 1:
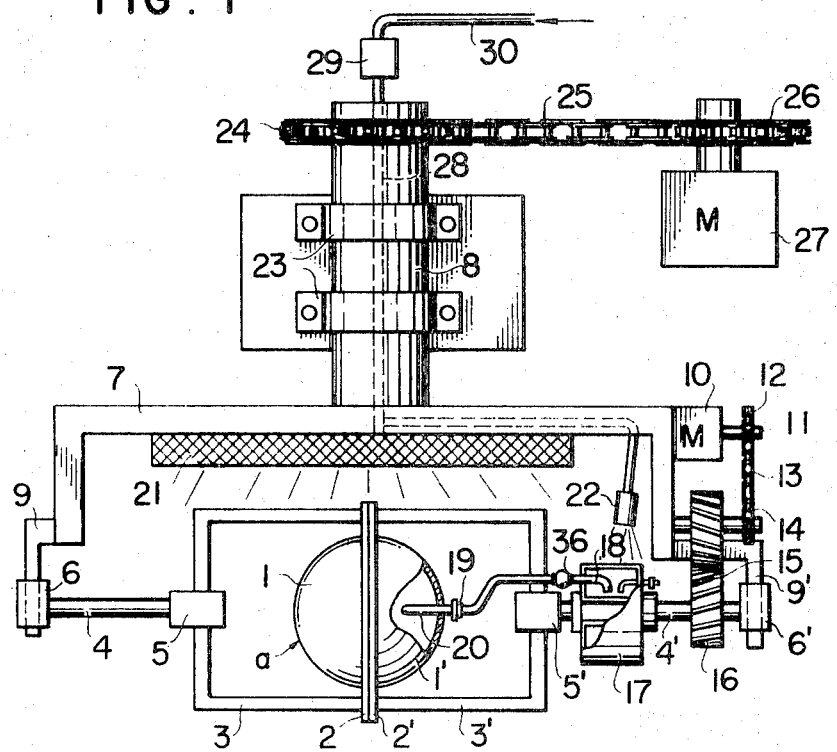
FIG. 1 discloses the apparatus for manufacturing a foam having a relatively denser surface in accordance with the present invention.
Figure 2:
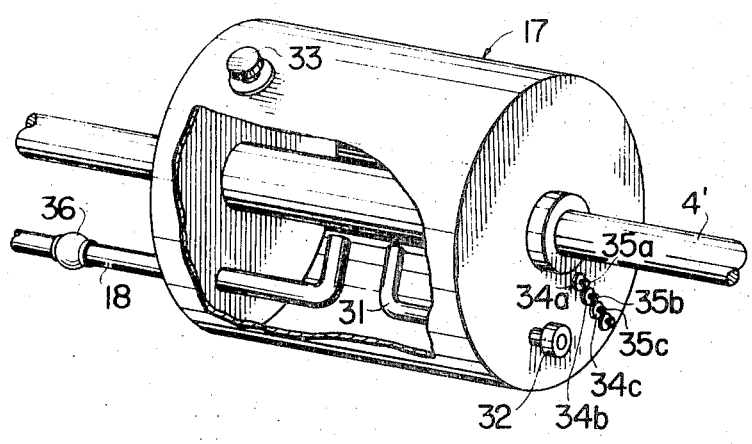
FIG. 2 is a partially cut perspective showing the steam producing water tank of FIG. 1.

With reference to FIGS. 1 and 2, a pair of metallic mold members 1 and 1' having the desired interior shape are held together by the joining members 2 and 2'. In the preferred embodiment disclosed, a hollow rotating mold $a$ is obtained by putting together the joining members 2 and 2'. Mold supporting frames 3 and 3' are fixed to the ends of the joining members 2 and 2', respectively, and rotating axles 4 and 4' are connected to the supporting frames 3 and 3' by collars 5 and 5'. Bearings 6 and 6' removably support the ends of the rotating axles 4 and 4' and are further connected to arms 9 and 9' which extend from the supporting frame 7. The supporting frame 7 is fixed on a rotating axle 8. The axle 8 is perpendicular to the rotating axles 4 and 4'. Also attached to the frame 7 is an electric motor 10 for rotating the axles 4 and 4'. The drive train from the electric motor 10 to the axle 4' is through a pair of sprockets 12 and 14, chain 13 and helical gears 15 and 16. The rotating axle 11 of the electric motor 10 connects with the sprocket 12 to drive the chain 13 which likewise drives the sprocket 14. Mounted on the same axle as the sprocket 14 is a helical gear 15 which meshes with a helical gear 16 mounted on the axle 4'. A steam producing apparatus 17 is fixed to the rotating axle 4' and is connected via a pipe 18 with the metallic mold $a$. The pipe 18 is connected with a nozzle 20 which protrudes into the center of the inside of the rotating mold $a$. The connecting pipe 18 terminates in an L-shape ending inside the steam producing apparatus 17. This L-shaped ending insures that the pipe 18 will only carry steam and will not be contaminated with water. A conduit tube 31 passes in a similar fashion to pipe 18 from the center of the inside of the steam producing apparatus 17 to a pressure safety system 32 comprising a disc that is capable of being ruptured on the outside of the tank. In addition, the tank contains an opening 33 for permitting the introduction of water. On the opposite side of the rotating axle 4' from the opening 33 is a series of exit opening 34$a$, 34$b$, 34$c$, which are, respectively, sealed by plugs 35$a$, 35$b$ and 35$c$.

The pipe 18 is connected with the nozzle 20 through a joint 19 and a pressure control valve 36 for controlling the pressure in the tank. A pair of heaters or burners 21 and 22 are mounted on the frame 7. Connecting the burners with either a gaseous or liquid fuel is a gas tube 30 that connects through the rotating axle 8 and the frame 7, respectively, to the burners 21 and 22. A bearing support 23 rotatably positions the axle 8 while a sprocket 24 is mounted on the axle 8. A chain 25 is driven by a sprocket 26 from a driving motor 27. The gas tube 30 connects with a rotary joint 29 which connects with a conduit 28 through the interior of the axle 8 and the frame 7. The burner 21 is utilized to provide heat for the rotating mold $a$ while the burner 22 provides heat for the steam apparatus 17.

The method and operation of the present invention will now be described in relationship to the elements described above.

The desired amounts of synthetic resin powders such as finely divided high or low density polyethylene, polypropylene or the like, and foamable synthetic resin beads such as coarse polystyrene, polyethylene and the like are placed in the hollow molds 1 and 1' respectively, which are then joined together to constitute the rotating mold $a$. The water tank of the steam producing apparatus is rotated so that its opening 33 is on the top and one of the plugs 35 of the desired effluent 34 is removed so that water is poured into the tank via the opening 33 until it overflows from the effluent opening 34. When the water begins to overflow, the pouring is topped and the effluent opening 34 is plugged with the plug 35. Thus, the desired amount of water is now present in the tank. Both the burners 21 and 22 are ignited and the motors 10 and 27 are driven to rotate the rotatable axle 8 and the rotatable axles 4 and 4' at the desired velocity along perpendicular axes.

When the rotating mold $a$ is sufficiently heated, the finely divided synthetic resin powders are fused and adhered onto the inside wall of the mold while the more coarse foamable synthetic resin beads do not adhere onto the metallic mold and remain in the interior of the mold.

When the synthetic resin powders are almost adhered and molded with the desired thickness onto the inside of the metallic mold, then steam is introduced through pipe 18 which rotates in cooperation with the rotating operation of a rotating mold $a$. The steam producing apparatus 17 is fixed to the rotating axis 4' and accordingly rotates with the same velocity. The water in the water tank produces the desired quantity of steam and when the pressure becomes sufficient the pressure valve 36 will open and the steam will be blown into the interior of the rotating mold $a$ from the nozzle 20 through the pipe 18 and joint 19. Thus, the unmolded foamable synthetic resin bead is completely foamed and fills up the interior of the synthetic resin skin layer previously molded in the inside wall of the rotating mold $a$. The relative quantity of material placed in the mold, the heat generated by the respective burners 21 and 22 and the amount of steam introduced via the steam producing apparatus 17 are all controlled to provide the desired consistency to the foamed molded body.

After the molding operation is completed both of the electric motors 10 and 27 are stopped and the burners 21 and 22 are extinguished. The rotating axles 4 and 4' are removed from the arms 9 and 9' and the rotating mold is moved to a cooling apparatus, not shown. After a sufficient period of cooling, which solidifies the molded article, the mold halves 1 and 1' are open and the desired molded article can be taken from the interior of the mold.

As mentioned previously, the amount of water is controlled in the steam producing apparatus 17 and the arrangement of the pipe 18 prevents the introduction of water into the molding halves 1 and 1', even during the rotation of the tank. It is also possible to utilize a water absorbing porous material such as asbestos in the water tank for keeping the water effectively in the tank.

If necessary, in the rotating mold $a$ an exhausting pipe can be fitted on the mold halves 1 and 1' so that water can be exhausted from the molded body and the foamable synthetic resin may be completely foamed in a uniform manner.

By the supplying of steam directly into the interior of the mold by a separate pipe that penetrates the rotating mold, the molding efficiency is remarkably improved without resorting to a complicated system and apparatus. This results from the fact that the steam producing apparatus 17 and the rotating mold $a$ are fixed relative to each other while the introduction of the steam and the quantity of the steam can be pre-set.

The present invention has found to be effective in providing a foaming of a polyolefin synthetic resin in the interior of a molded body which has not heretofore been possible. With the use of polystyrene beads as the foamable synthetic resin a molded article of foam being 40 to 50 times amplified by the present process can be accomplished.

What is claimed is:

1. Apparatus for manufacturing a foamed thermoplastic body having a relatively denser surface or skin comprising;

a support rotatably mounted; means to drive the support; a mold member having a mold cavity rotatably mounted on the support and adapted to receive foamable thermosplastic material; means to drive the mold member; means for producing steam fixed to and rotating with the mold member; means for heating the mold member and means for controlling the introduction of steam into the mold member while the mold member is rotating whereby the inside surface of the mold cavity is coated with some of the thermoplastic material before the steam is introduced to foam the remaining thermoplastic material.

2. The apparatus of claim 1 where the support is mounted to rotate about a perpendicular axis to the rotating mold member.

3. The apparatus of claim 2 where the support carries the means for heating the mold member and also a heater for heating the means for producing steam.

4. The apparatus of claim 2 where the means for producing steam includes a cylindrical tank and a connecting pipe to the mold member terminating in an L-shape within the tank.

5. The apparatus of claim 4 where the end wall of the cylindrical tank contains a series of ports aligned in a single plane.

* * * * *

UNITED STATES PATENT OFFICE
CERTIFICATE OF CORRECTION

Patent No. 3,843,285      Dated October 22, 1974

Inventor(s)  Haruo Nitta et al

It is certified that error appears in the above-identified patent and that said Letters Patent are hereby corrected as shown below:

IN THE HEADING:

First Inventor- Harjo Nitta--should be-- Haruo Nitta--

Signed and sealed this 4th day of February 1975.

(SEAL)
Attest:

McCOY M. GIBSON JR.
Attesting Officer

C. MARSHALL DANN
Commissioner of Patents